US012761322B2

(12) United States Patent
Podolski

(10) Patent No.: US 12,761,322 B2
(45) Date of Patent: Oct. 13, 2026

(54) SENSOR ASSEMBLY COMPRISING A COVER ELEMENT, AND METHOD FOR PRODUCING A COVER ELEMENT OF A SENSOR ASSEMBLY OF A MOTOR VEHICLE

(71) Applicant: Webasto SE, Stockdorf (DE)

(72) Inventor: Thomas Podolski, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 849 days.

(21) Appl. No.: 18/187,080

(22) Filed: Mar. 21, 2023

(65) Prior Publication Data

US 2023/0305112 A1 Sep. 28, 2023

(30) Foreign Application Priority Data

Mar. 22, 2022 (DE) ..................... 10 2022 106 654.1

(51) Int. Cl.
*G01S 7/481* (2006.01)
*B62D 25/06* (2006.01)
(Continued)

(52) U.S. Cl.
CPC ............ *G01S 7/4813* (2013.01); *G01S 17/86* (2020.01); *G01S 17/931* (2020.01); *B62D 25/06* (2013.01)

(58) Field of Classification Search
CPC ...... G01S 7/4813; G01S 17/86; G01S 17/931; G01S 2007/4977; B62D 25/06
See application file for complete search history.

(56) References Cited

U.S. PATENT DOCUMENTS

2006/0086710 A1* 4/2006 Meiler .................. H05B 3/265 219/202
2014/0332518 A1* 11/2014 Lesmeister ............. H05B 3/06 219/202
(Continued)

FOREIGN PATENT DOCUMENTS

CN 106465479 A 2/2017
CN 112166337 A 1/2021
(Continued)

OTHER PUBLICATIONS

DE 102018109884 A1 English (Year: 2019).*
(Continued)

*Primary Examiner* — Yuqing Xiao
*Assistant Examiner* — Jempson Noel
(74) *Attorney, Agent, or Firm* — Fitch, Even, Tabin & Flannery, LLP

(57) ABSTRACT

A vehicle sensor assembly having at least one sensor element emitting and/or detecting electromagnetic radiation in at least one measuring direction to determine a measuring signal, a cover element in front of the sensor element in the at least one measuring direction being an injection-molded plastic part having at least one layer transparent to the electromagnetic radiation, and a heating feature having a plurality of conductor paths applied to a backing film molded to the cover element, the backing film including the conductor paths thus forming an insert of the injection-molded cover element, the conductor paths being at least partially located on the side of the backing film facing the sensor element. The conductor paths are connected together by at least two bus bars that each at least partially form an electrical connecting element protruding from the cover element and being exposed for electrical contact with the electrical connecting elements.

20 Claims, 8 Drawing Sheets

(51) Int. Cl.
*G01S 17/86* (2020.01)
*G01S 17/931* (2020.01)

(56) References Cited

U.S. PATENT DOCUMENTS

| | | | | |
|---|---|---|---|---|
| 2017/0251527 | A1 | 8/2017 | Schall | |
| 2018/0176995 | A1 * | 6/2018 | Klein | B32B 17/10036 |
| 2018/0192477 | A1 | 7/2018 | Klein | |
| 2018/0287252 | A1 | 10/2018 | Nicke | |
| 2019/0306926 | A1 * | 10/2019 | Deering | B29C 45/14 |
| 2021/0239795 | A1 | 8/2021 | Kilias | |
| 2021/0300159 | A1 * | 9/2021 | Tooker | B60J 1/1884 |
| 2022/0407214 | A1 * | 12/2022 | Bouabdalli | B29C 45/14377 |
| 2023/0171855 | A1 * | 6/2023 | Hirotani | H05B 3/16<br>219/202 |

FOREIGN PATENT DOCUMENTS

| | | | | |
|---|---|---|---|---|
| DE | 102008006553 | A1 | 8/2009 | |
| DE | 102015218876 | A1 | 3/2017 | |
| DE | 102018109884 | A1 * | 10/2019 | G01S 7/4813 |
| WO | 2017077133 | A1 | 5/2017 | |
| WO | 2021032599 | A1 | 2/2021 | |

OTHER PUBLICATIONS

Chinese Office Action Issued in Corresponding CN Application: 202310287611.8; dated Jan. 12, 2026; 24 pages; in Chinese with English machine translation.
Examination report dated Dec. 14, 2022, for companion application in Germany (German with English machine translation); 7 pages.

* cited by examiner

SENSOR ASSEMBLY COMPRISING A COVER ELEMENT, AND METHOD FOR PRODUCING A COVER ELEMENT OF A SENSOR ASSEMBLY OF A MOTOR VEHICLE

CROSS-REFERENCE TO RELATED APPLICATION

This application claims priority from German Patent Application Number 10 2022 106 654.1, filed on Mar. 22, 2022, which is hereby incorporated herein by reference in its entirety for all purposes.

FIELD

The invention relates to a sensor assembly of a motor vehicle having the features of the preamble of claim 1. Furthermore, the invention relates to a roof module having at least one such sensor assembly and to a motor vehicle on which at least one such roof module is disposed. Also, the invention relates to a method for producing a cover element of a sensor assembly of a motor vehicle.

BACKGROUND

A sensor assembly of this kind is known from practice and can be used on a motor vehicle for monitoring a vehicle environment. For this purpose, the sensor assembly comprises a sensor element emitting electromagnetic radiation, e.g., in the form of laser radiation, in one or multiple specific directions so that a system of the vehicle can detect and process the vehicle environment including the course of the road, the traffic situation and the like. For example, the sensor element is disposed in a roof area of the vehicle or in the area of the vehicle front end and positioned behind a cover element transparent to the electromagnetic radiation emitted by the sensor element. The cover element can be made of a plastic material. A heating feature may be provided for keeping the cover element transparent to the electromagnetic radiation even under bad weather conditions and to be able to deice it, the heating feature comprising conductor paths disposed on the inner side of the cover element, which faces the sensor element. Sensor assemblies of this kind are known from DE 10 2018 109 884 A1 and WO 2021/032599 A1, for example.

Roof modules are already widely employed in vehicle manufacturing since these roof modules are prefabricated as separate functional modules and can be delivered to the assembly line when assembling the vehicle. At its outer surface, the roof module at least partially forms a roof skin of the vehicle roof, which prevents moisture and air flows from entering the vehicle interior. The roof skin is composed of one or multiple panel components, which can be made of a stable material, such as painted metal or painted or slid-colored plastic. The roof module can be a part of a rigid vehicle roof or a part of an openable roof subassembly.

Furthermore, the development in vehicle manufacturing is increasingly focusing on autonomously and semi-autonomously driving motor vehicles. In order to enable the vehicle controller to control the motor vehicle autonomously or semi-autonomously, a plurality of sensor elements, in particular environment sensors (e.g., lidar sensors, radar sensors, (multi-)cameras, etc. including other (electrical) components), are employed, which are integrated in the roof module and detect the environment surrounding the motor vehicle and determine, for example, a current traffic situation from the acquired environment data. Roof modules which are equipped with a plurality of environment sensors are also known as roof sensor modules (RSM). For this purpose, the known environment sensors send and/or receive suitable electromagnetic signals, such as laser beams or radar beams, allowing a data model of the vehicle environment to be generated by signal evaluation and to be used for controlling the vehicle.

The environment sensors for monitoring and detecting the vehicle environment are typically mounted on the vehicle roof since the vehicle roof is typically the highest point of a vehicle, from where the vehicle environment is easily visible. The environment sensors are typically placed on top of the panel component of the roof module, which forms the roof skin, as attachments. When the environment sensor is in use, environmental conditions, such as ice formation, pose the risk that a see-through area semi-transparent or transparent to the environment sensor becomes covered in ice, which interferes with a signal detection of the environment sensor and causes the see-through area to become completely opaque in the worst case. For this reason, it is known for the see-through area to be deiced using a cover element having a heating feature, for example.

In the course of the further development in the field of the integration of such heating features, in particular heating films, however, the problem of insufficient access to electrical contacts when connecting or integrating such a heating feature in an electrical circuit has arisen. In particular, the heating feature is overmolded with and/or integrated in a plastic layer, such as a transparent polycarbonate (PC) layer, as a flat heating film in the course of an injection-molding process in the state of the art. After the heating features has been injected or the cover element, which is an injection-molded part, has been molded, the state of the art requires for the electrical contact areas of the heating feature to be exposed again since they are covered by a plastic layer as a result of the injection-molding process. This requires a high degree of precision since the conductor paths underneath, which are used for establishing electrical contact, are often very thin-layered, e.g., no more than 0.1 mm. Alternatively, it is possible in the state of the art for the electrical contact points to be covered with a suitable cover and/or cutout during the injection-molding process, for example, so that they are not covered with a plastic layer during the injection molding In the case of exterior heating films known from the state of the art, the cover has a thickness that corresponds to no more than the heating film including a coating in the area of the heating film. The remaining cover, on the other hand, has a greater and robust material thickness. This local thinning leads to optical sink marks and can be easily damaged or pierced by external forces (flying stones, pointed objects, etc.) and thus lead to defects in the cover. The heating conductor paths or the heating layer of known interior heating films form(s) an inner surface of the cover. The paths or layers are protected by a painted protective coating at most. The contact surfaces for the electrical connection, however, are not coated, i.e., kept free. When a known two-component solution is used, the heating film except for the contact points is overmolded with a second material component. On the whole, the known cover elements comprised in sensor assemblies therefore do not offer a satisfactory solution in optical terms and/or in terms of production and/or robustness.

SUMMARY

Based on the disadvantages and problems mentioned above, one object of the invention is to propose an enhanced sensor assembly and/or a method which at least mitigate the problems and disadvantages mentioned above and in particular improve a way of making electrical contact with a heating feature.

This object is attained by a sensor assembly having the features of claim 1. Furthermore, the object is attained by a roof module according to claim 14, which has at least one such sensor assembly, and by a motor vehicle according to claim 15, which has such a roof module. Furthermore, the object is attained by a method having the features of claim 16.

Advantageous embodiments of the invention are the subject matter of the dependent claims. Moreover, any and all combinations of at least two features disclosed in the description, the claims, and/or the figures fall within the scope of the invention. Naturally, the explanations given in connection with the sensor assembly equivalently relate to the roof module and/or the motor vehicle according to the invention without being mentioned separately in its context. Likewise, any and all features and embodiments disclosed in connection with the sensor assembly equivalently relate to the method according to the invention, albeit not verbatim. In particular, linguistically common rephrasing and/or an analogous replacement of respective terms within the scope of common linguistic practice, in particular the use of synonyms backed by the generally recognized linguistic literature, are of course comprised by the content of the disclosure at hand without every variation having to be expressly mentioned.

The invention proposes a sensor assembly of a motor vehicle, the sensor assembly comprising at least one sensor element emitting and/or detecting electromagnetic radiation in at least one measuring direction to determine a measuring signal, a cover element disposed in front of the sensor element in the at least one measuring direction and being an injection-molded plastic part which has at least one layer and is transparent to the electromagnetic radiation, and a heating feature comprising a plurality of conductor paths, which are applied to a backing film in particular by screen printing or wire laying, the backing film being molded to the cover element, the backing film including the conductor paths thus forming an insert of the injection-molded cover element, the conductor paths being at least partially located on the side of the backing film facing the sensor element. In other embodiments, the plurality of conductor paths can be vapor-deposited on the backing film as a plurality of conductor surfaces. The sensor assembly is characterized in that the conductor paths are preferably connected to each other in an electrically conductive manner by at least two bus bars and the at least two bus bars each at least partially form an electrical connecting element protruding from the cover element and being exposed so that electrical contact can be made with the electrical connecting elements. Particularly preferably, the sensor assembly comprises at least a lidar sensor and a camera sensor.

The cover element preferably forms a see-through area through which the at least one sensor element can send and/or receive the electromagnetic radiation. The sensor element is preferably disposed in such a manner relative to the and/or on the cover element that it looks through the latter. Particularly preferably, the sensor element is configured to emit and/or receive the measuring signal in the measuring direction, which in particular defines a main measuring direction and, in the case of an optical measuring element, preferably an optical axis. Preferably, the measuring direction defines a main cone axis about which a conical detection field opens from the sensor element. A cone opening angle is preferably sensor-specific can be manipulated, in particular increased or reduced, by means of an optical element, such as a lens, if necessary. The at least two bus bars preferably connect the plurality of conductor paths in such a manner that the conductor paths are connected in series. Electrical energy can flow through the plurality of conductor paths if each of the bus bars is connected to a voltage source via one or more than one cable, for example. Part of the electrical energy is transformed into heat in the process, which is how the heating effect can be provided. The heat is preferably emitted to the exterior side of the cover element through the plastic layer so that ice formed on the cover element can be melted. In this way, the deicing effect can be achieved.

The at least one sensor element is preferably at least part of an environment sensor, in particular a lidar sensor and/or a radar sensor and/or a camera sensor and/or a multi-camera sensor and/or an ultrasonic sensor and/or the like. Lidar sensors operate in a wavelength range of 905 nm or about 1550 nm, for example. The material of the cover element, which preferably forms a see-through area through which the lidar sensor looks, is preferably transparent to the wavelength range used by the environment sensor and is therefore selected as a function of the wavelength(s) used by the environment sensor. A field of view of the environment sensor preferably extends symmetrically around the optical axis of the environment sensor in the shape of a cone having a sensor-specific cone opening angle.

The method according to the invention for producing the cover element of the sensor assembly comprises the following steps: providing a backing film having a first side and a second side; applying, in particular by screen printing or wire laying, a plurality of conductor paths and at least two bus bars to the first side, in particular a heating side or an inner side of the film; introducing the backing film with the conductor paths, in particular inserting the backing film with the conductor paths essentially in a U-shape, into a cavity of an injection mold in such a manner that the two bus bars protrude over the conductor paths; filling the cavity of the injection mold with a plastic material; hardening the plastic material in the cavity for forming the cover element with the film molded thereto; and demolding the cover element with the film molded thereto. Particularly preferably, any type of heating structure including the two bus bars is preferably screen-printed and/or wire-laid onto the inside of the backing film (where it forms a +/— contact, for example), the backing film being made of PC material, for example. The backing film is preferably made of the same material or plastic as the one used as an injection-molding compound for producing the cover element so that the injection-molding process preferably leads to a stable and invisible connection. The backing film is preferably placed in the injection mold in the shape of a U and is overmolded with the injection-molding plastic at least once, but particularly preferably twice. Preferably, lateral mold inserts which divert the film as intended are used for placing or holding the film in the U-shape in the injection mold. Preferably, the film is held in its position centrally between the two mold inserts by vacuum. For example, a transparent first plastic and/or a second plastic, which is transparent at least to the sensor element, is injected onto the backing film. In other words, suitable holders inside the injection mold divert, i.e., bend, the backing film into the U-shape according to the invention prior to the injection of the plastic. The electrical connecting elements and/or the contact points formed on the bus bars are preferably kept free during the injection-molding process. This is possible, for example, if the bus bars abut against the injection mold at the contact points, which means that they cannot be covered by the plastic. Additional covers are possible, as well. Otherwise, the backing film is preferably covered and/or wetted and/or overmolded with at least one plastic layer all around. Particularly preferably, a/the interface, which is configured as a terminal connection to a plug of at least one cable, for example, is formed because of a geometrical shape of the injection-molded part. This interface is preferably molded out of the injection-molding plastic.

As a result of the configuration of the cover element according to the invention, the visual appearance when the cover element is disposed on the motor vehicle and/or the roof module can be improved significantly. In particular, the invention achieves that the heating feature, in particular the plurality of conductor paths, appears more delicate; e.g., it appears to float. The bus bars, on the other hand, which are preferably larger than the plurality of conductor paths, preferably protrude from the in particular plane part of the cover element against the measuring direction of the sensor element. This makes the bus bars visually recede with the result that no contact points are visible from outside the vehicle. Likewise, the production of the cover element according to the invention is more cost-efficient since a technically simple and cost-efficient contact solution is realized. In particular, plugs no longer have to be integrated on or on top of the backing film according to the invention. So the manufacturer can dispense at least with the otherwise elaborate contact process, e.g., when soldering electrical contacts. So the process reliability and the robustness of the cover element are increased overall.

In a preferred embodiment, the backing film has been molded to the cover element in such a manner together with the conductor paths after the injection-molding process that the connecting elements at least partially formed by the at least two bus bars are formed in particular in end portions of leg areas of the cover element and at least part of each leg area preferably forms a mechanical contact. The cover element can have basically any shape. Preferably, it comprises at least two legs which protrude from an otherwise plane cover element. The cover element can basically have a bent and/or curved, in particular convex, shape, from which the two legs protrude. Particularly preferably, the cover element has a shape in which the two legs are substantially shorter than the leg connection. The plane part of the cover element preferably defines the leg connection. One of the two bus bars is preferably comprised in each of the legs, each leg being preferably overmolded with the injection-molding plastic except for its end portion. Particularly preferably, the leg areas are overmolded with a plastic which is non-transparent to the human eye and which in particular appears black with the result that these areas are hardly perceivable when the cover element is in the installed state. The end area preferably describes an end portion or a head area of the legs, each head area forming an electrical connecting element. The head area is preferably not coated and/or covered with a plastic layer; instead, it is exposed for making electrical contact.

Particularly preferably, the plastic injection-molded in the two leg areas forms part of a plug connection. To this end, a negative of the plug and/or clamping and/or holding connection can be molded in the leg area in the injection mold, for example, with the result that a corresponding plug and/or clamping and/or holding connection is produced when injecting the plastic.

Particularly preferably, the cover element, which is an injection-molded part, comprises at least two plastic layers, which can preferably be made of different plastics having favorable connecting properties to each other. The first plastic layer can preferably be transparent within the wavelength range visible to the human eye and can be made of polycarbonate, for example. The first plastic layer can be injection-molded over the backing film in the area of the plane portion of the cover element, for example, in particular in the area of the leg connection. The second plastic layer can preferably be opaque, i.e., non-transparent, in the wavelength range visible to the human eye and appear black, for example. Particularly preferably, the backing film is overmolded with at least the second plastic layer in the leg areas. The first and the second plastic layer are preferably transparent to the wavelength range used by the sensor element. If the first plastic layer is transparent, it is preferred for the entire cover element to be in-mold laminated with the opaque, in particular black, second plastic layer. If the first plastic layer is opaque, in particular black, it is preferred for an area between the legs to be in-mold laminated, in particular locally, with this plastic layer. The second layer is particularly preferably formed at least in the area of the legs. When seen from outside the motor vehicle, the heating conductor tracks appear to be floating, preferably in the area of the transparent plastics. These floating conductor paths disappear at both ends of the cover element, in particular where the cover element meets the leg areas, by being diverted into the non-transparent, in particular black, plastic. Thus, the bus bar paths are preferably located behind the non-transparent plastic and do not occupy any space in the visible area of the cover element. This avoids having to do an additional black print for covering the bus bars. Moreover, less area is occupied in an area visible from outside. This increases the optical quality of the cover element.

In a preferred embodiment, the two leg areas of the cover element protrude from the latter against the measuring direction. The leg areas of the cover element preferably protrude from the cover element in a direction opposite a direction in which the sensor element looks. Preferably, the leg areas protrude in the direction of an interior of the motor vehicle when the cover element is disposed on the motor vehicle.

In a preferred embodiment, the bus bars are at least partially disposed in the respective leg areas of the cover element and are preferably overmolded with the injection-molding plastic, particularly preferably with a plastic layer non-transparent to the human eye and in particular appearing black. Particularly preferably, the connecting elements formed at the end portions are therefore exposed and can particularly preferably made electrical contact with. For this purpose, a mechanical connecting element is preferably formed in the leg areas by a suitable geometrical shape of the injection-molding plastic, which has at least one layer.

Particularly preferably, the cover element comprises an outer side, which faces a vehicle environment, and an inner side, which faces the sensor element, and the backing film is disposed on the outer side of the cover element. Of course, the backing film can also be disposed on the inner side in other embodiments. Particularly preferably, the backing film is the outermost layer of the cover element, preferably without considering other coatings after the injection-molding process. Preferably, the backing film including the conductor paths applied thereto, e.g., printed thereon, forms the outermost layer of the cover element, in particular locally. In this case, the backing film is the outermost layer. The conductor paths are disposed on the side of the backing film facing the sensor element so as to protect it. Alternatively, the backing film can be interiorly integrated in a first injection-molding component. This can be advantageous since it makes the in particular U-shaped diversion of the backing film during the production of the cover element unnecessary.

The cover element of the sensor assembly according to the invention can in particular be made of at least one polycarbonate material or another material suitable for the application in question. It is also preferred for part and/or portions of the cover element to be made of different plastics so as to provide different optical properties in different areas of the cover element, for example.

Accordingly, the backing film of the sensor assembly according to the invention comprises or is made of at least one polycarbonate material in a preferred embodiment. The backing film is preferably made of the same plastic as the cover material or a body of the cover material. The plastic of the cover material can preferably contain a plastic base material which is preferably blended with at least one additive to adjust an optical and/or mechanical property. For example, the additive can make the base material opaque, i.e., non-transparent, to wavelengths in the range visible to the human eye.

In an advantageous embodiment of the sensor assembly according to the invention, the cover element is provided with a protective coating on its outer side, which faces the vehicle environment, so as to be able to protect the cover element from damage and wear. Particularly preferably, an outward-facing side of the in particular exterior backing film is provided with the protective coating. The protective coating can consist of a paint system applied in one or two layers and offering scratch, weather and/or chemical protection. The paint system used can be a thermally hardening system or a paint system hardening under UV radiation. It is possible for the paint system to be applied by spraying or flow coating.

Advantageously, the protective coating has a lower refractive index than the injection-molded plastic material of the cover element. This can improve the transmission behavior of the cover element.

In a preferred embodiment, the cover element at least partially comprises a first plastic component, which is non-transparent to the human eye and transparent to the at least one sensor element, in particular a lidar sensor. Alternatively or additionally (i.e., and/or), the cover element at least partially comprises a second plastic component, which is transparent to the human eye and also to the at least one sensor element, in particular a camera or a camera sensor. So the cover element preferably comprises two plastic components which differ at least in their transparency (in particular to wavelengths of visible light). The first and/or the second plastic component can each have one layer or two layers or be made of a plastic material or a multi-component plastic material. Preferably, the cover element has an area made of the first plastic component and at least one other area made of the second plastic component. By providing the first plastic component, the cover element preferably appears black with the result that it preferably blends in visually with the remaining vehicle body. By providing the second plastic component, an area through which the sensor element, which operates in the visible wavelength range, can send and/or receive electromagnetic signals can additionally be formed.

In a preferred embodiment, the backing film is at least partially in-mold laminated and/or overmolded with a first plastic component, which is non-transparent to the human eye and transparent to the at least one sensor element, in particular a lidar sensor. Alternatively or additionally (i.e., and/or), the backing film is at least partially in-mold laminated and/or overmolded with a second plastic component, which is transparent to the human eye and to the at least one sensor element, in particular a camera or a camera sensor. Thus, the backing film preferably forms the outer side (with respect to the measuring direction) of the cover element.

The sensor assembly according to the invention can basically be disposed anywhere on a motor vehicle and/or a roof module and can be configured for different purposes. For example, the sensor assembly is integrated in a vehicle roof, in particular a roof module, which at least partially forms the vehicle roof, and, as such, is preferably part of a system for autonomous or semi-autonomous driving of the vehicle in question. In this case, the cover element preferably forms an outer skin element of the vehicle roof, i.e., in particular a fixed roof portion which is immobile relative to the vehicle structure. It is also possible for the sensor assembly to be disposed on a vehicle roof and/or the roof module as a dome. In this case, the cover element forms at least part of a housing of the sensor assembly, which accommodates the sensor element. Particularly preferably, the motor vehicle and/or the roof module can comprise multiple sensor assemblies and/or multiple cover elements.

In an alternative embodiment, the cover element forms an outer skin element of a vehicle front end or a vehicle rear end. In this case, the sensor assembly can also be part of an adaptive cruise control, a parking assistant and/or any other safety feature of the vehicle in question.

In a preferred embodiment, a roof module for forming a vehicle roof on a motor vehicle is proposed, the roof module comprising a panel component, which at least partially forms a roof skin of the vehicle roof, the roof skin serving as an outer sealing surface of the roof module, and at least one sensor assembly according to any embodiment of the invention.

Also, a motor vehicle comprising a vehicle body and at least one such roof module is preferred, the roof module being arranged on, in particular glued and/or screwed and/or welded and/or soldered to, the vehicle body as a structural unit.

The conductor paths can be applied to the backing film by any method. Screen printing, stamping and transferring are possible methods. Screen printing, dispensing, hot stamping and transfer printing are to be mentioned as specific examples. Moreover, suitable hardening methods, such as laser hardening, can be employed to harden the conductor paths.

Furthermore, the conductor paths can be applied to a wide film web or a film cut whose dimensions correspond to the dimensions of the backing film or which corresponds to the backing film placed in the cavity.

When injection-molding the cover element, the backing film or the film cut is overmolded in such a manner that the side on which the conductor paths are disposed is overmolded with the plastic material.

The method according to the invention is in particular configured in such a manner that the backing film already provided with the conductor paths and the bus bars is unwound from a first roll. Then, the backing film can be die-cut for producing a film cut which has the conductor paths and which is placed in the injection mold in particular by means of a robot and overmolded with the plastic material in a cavity of the injection mold. After the cover element has been demolded from the cavity of the injection mold, the cover element is preferably provided with a protective coating on the in particular exterior backing film so as to protect it from scratching, weather and or chemicals.

Of course, the embodiments and the illustrative examples mentioned above and yet to be discussed below can be realized not only individually but also in any combination with each other without departing from the scope of the present invention. Moreover, the embodiments and illustrative examples mentioned above and yet to be discussed below also relate equivalently or at least similarly to the roof module according to the invention without being separately mentioned in its context.

BRIEF DESCRIPTIONS OF THE DRAWINGS

Embodiments of the invention are schematically illustrated in the drawings and will be discussed by way of examples below.

DETAILED DESCRIPTION

Figure 1:
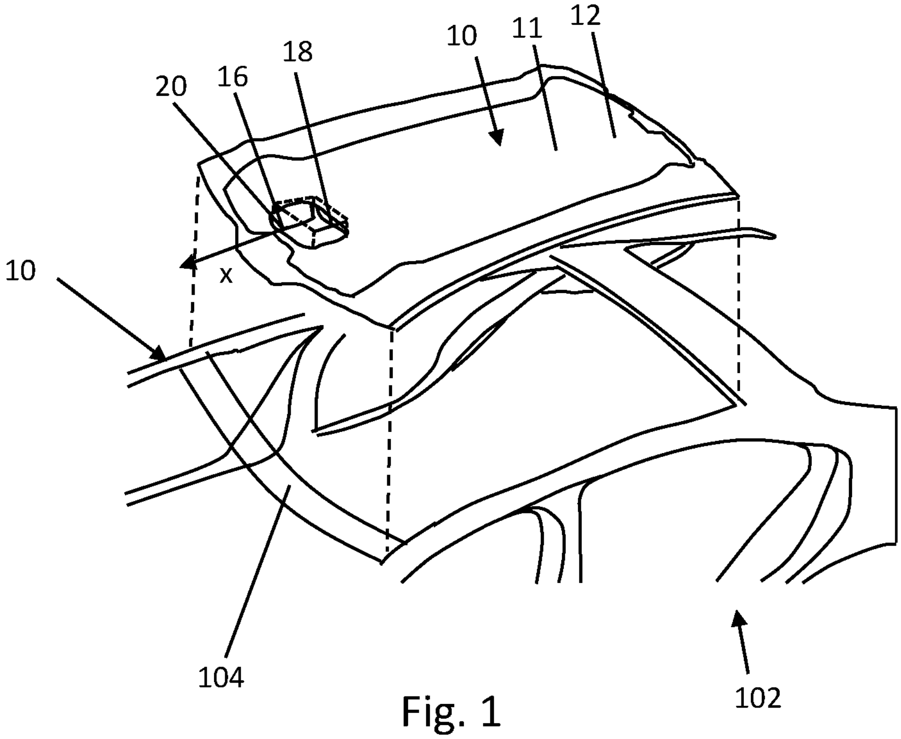
FIG. 1 is a schematic illustration of a motor vehicle comprising a roof module and an exemplary embodiment of the sensor assembly according to the invention.
Figure 2:
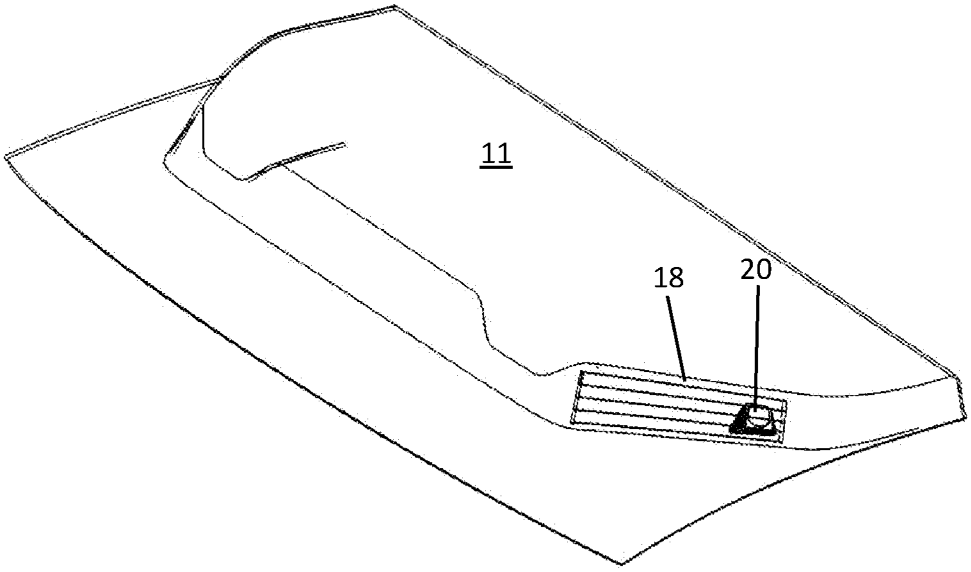
FIG. 2 is a first schematic illustration of a roof module comprising an exemplary embodiment of the sensor assembly according to the invention.

FIG. 1 shows a motor vehicle. A roof module 10 is formed on a vehicle body 102, in particular on a body roof frame 104 of vehicle body 102. Roof module 10 comprises a panel component 11, which at least partially forms a roof skin of a vehicle roof 12, the roof skin serving as an outer sealing surface of roof module 10. For example, panel component 11 is an injection-molded part made of a plastic material or a glass; in the case at hand, it is made of a polycarbonate material.

Figure 7:
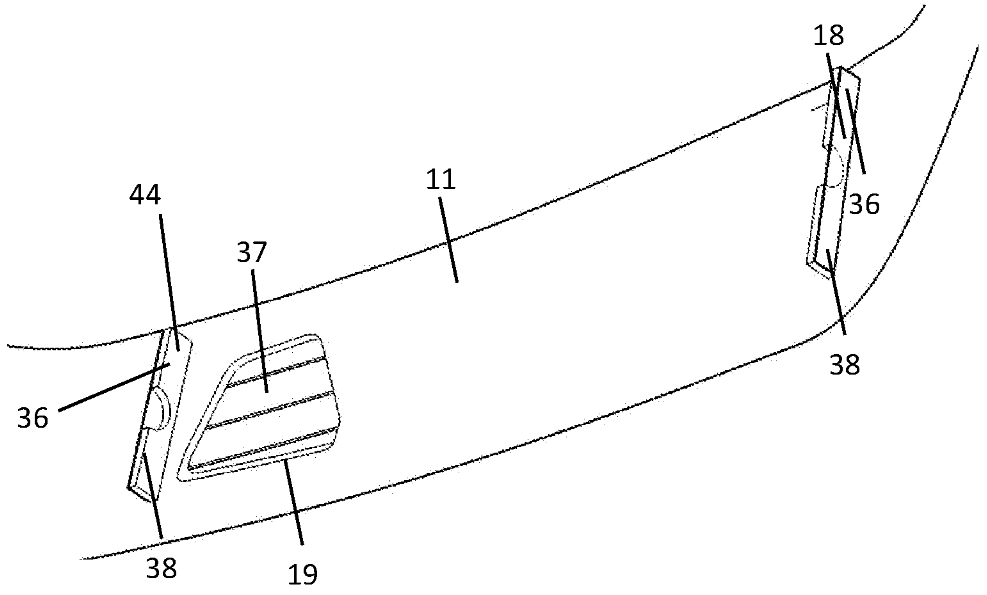
FIG. 7 is a first detail view of an exemplary embodiment of the sensor assembly according to the invention.

Roof module 10 further comprises at least one sensor assembly 16 according to the invention. Sensor assembly 16 comprises a cover element 18, which preferably forms part of a sensor housing in which at least one sensor element 20 is disposed. In the case at hand, cover element 18 covers a camera opening 19 of panel component 11 and preferably closes said camera opening 19 in a moisture-proof manner relative to the vehicle environment (see FIG. 7). The at least one sensor element 20, which is a camera 23, for example, looks through camera opening 19.

Figure 3:
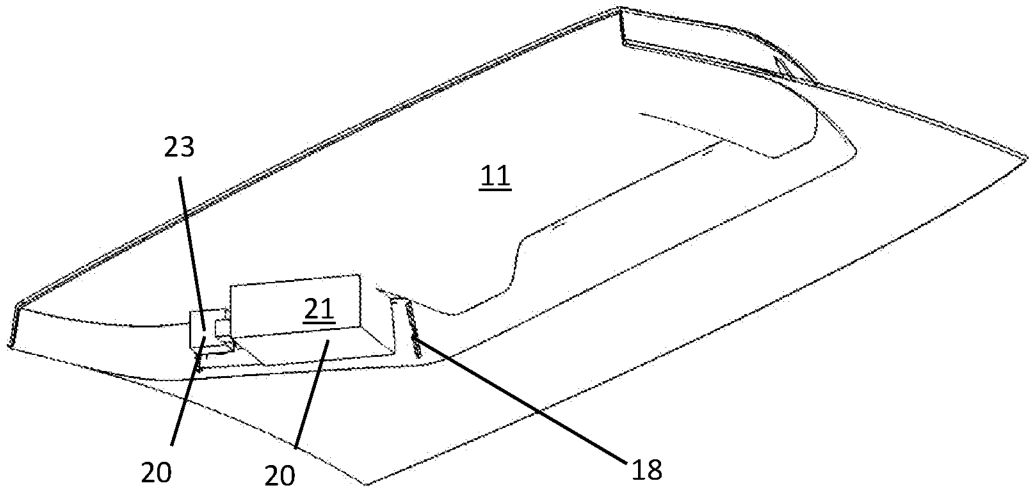
FIG. 3 is a second schematic illustration of a roof module comprising an exemplary embodiment of the sensor assembly according to the invention.
Figure 4:
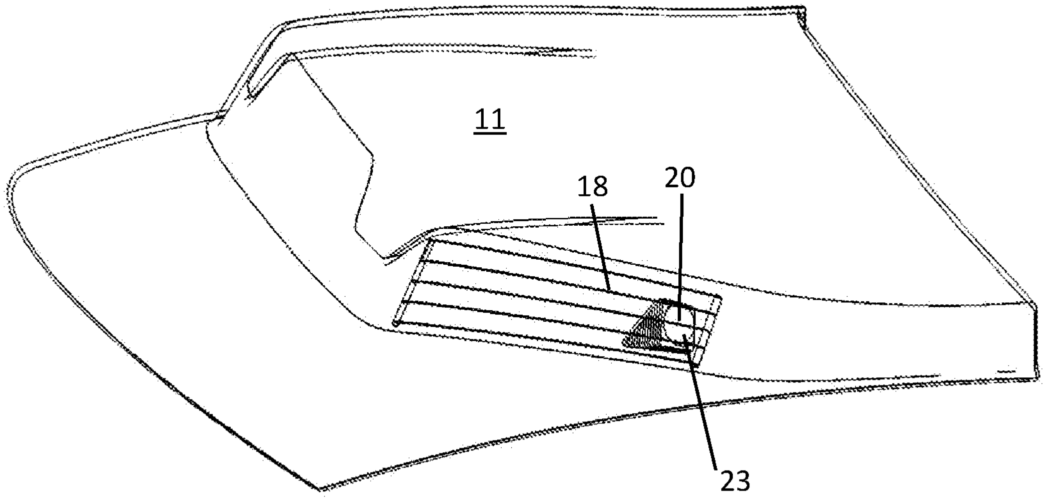
FIG. 4 is a third schematic illustration of a roof module comprising an exemplary embodiment of the sensor assembly according to the invention.
Figure 5:
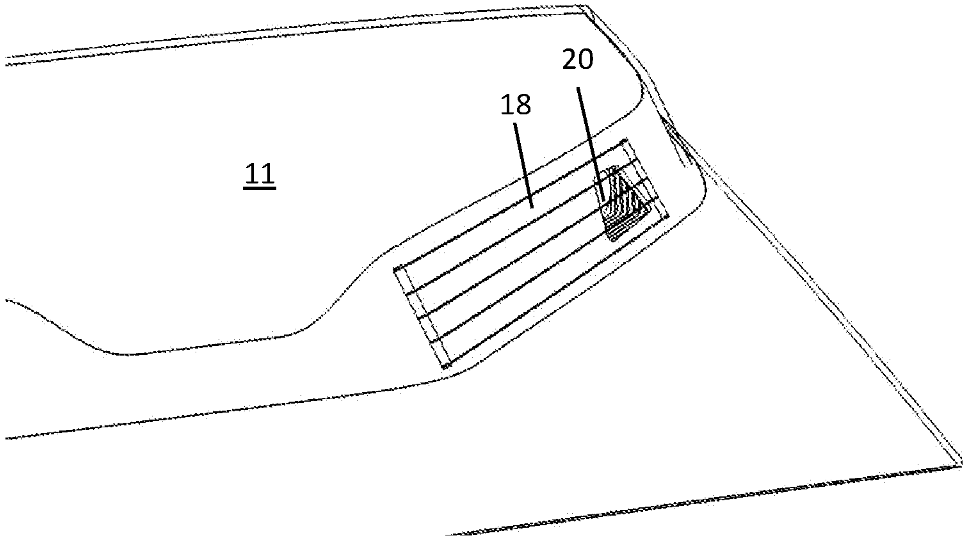
FIG. 5 is a fourth schematic illustration of a roof module comprising an exemplary embodiment of the sensor assembly according to the invention.
Figure 6:
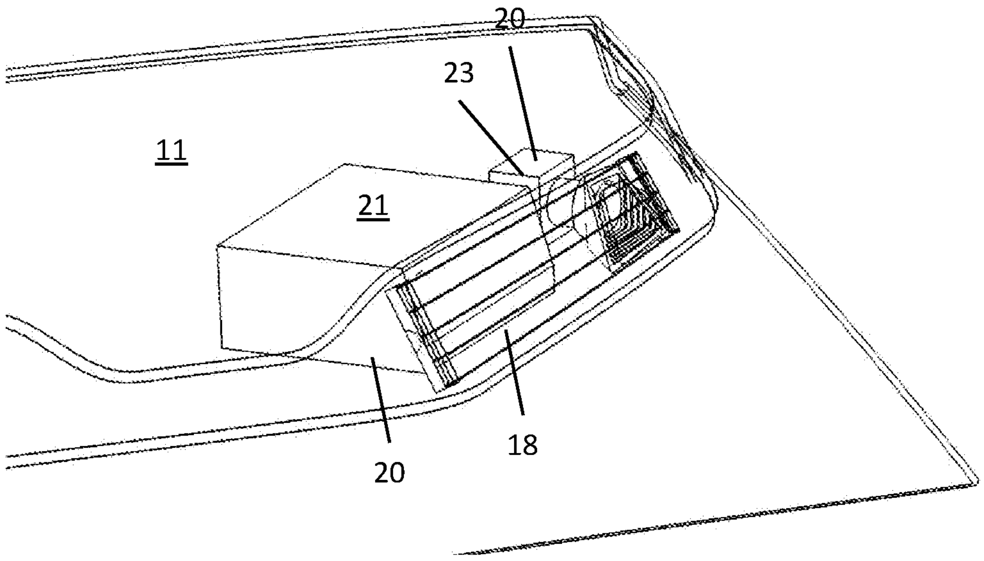
FIG. 6 is a fifth schematic illustration of a roof module comprising an exemplary embodiment of the sensor assembly according to the invention.

In this case, cover element 18 forms a see-through area, in particular a window, through which the at least one sensor element 20 looks. In the case at hand, the at least one sensor element 20 further comprises a lidar sensor 21, which emits laser light in a measuring direction x. The laser light passes through cover element 18 in the form of electromagnetic signals. Lidar sensor 21 is configured to send and/or receive the electromagnetic signals and to evaluate them in such a manner by means of an evaluating feature, for example, that a vehicle environment can be reconstructed based thereon (see FIGS. 3 and 6). Lidar sensor 21 is preferably disposed behind cover element 18 in such a manner that it looks through an area of cover element 18 which is in-mold laminated in black. This area is preferably opaque to the human eye.

Figure 13:
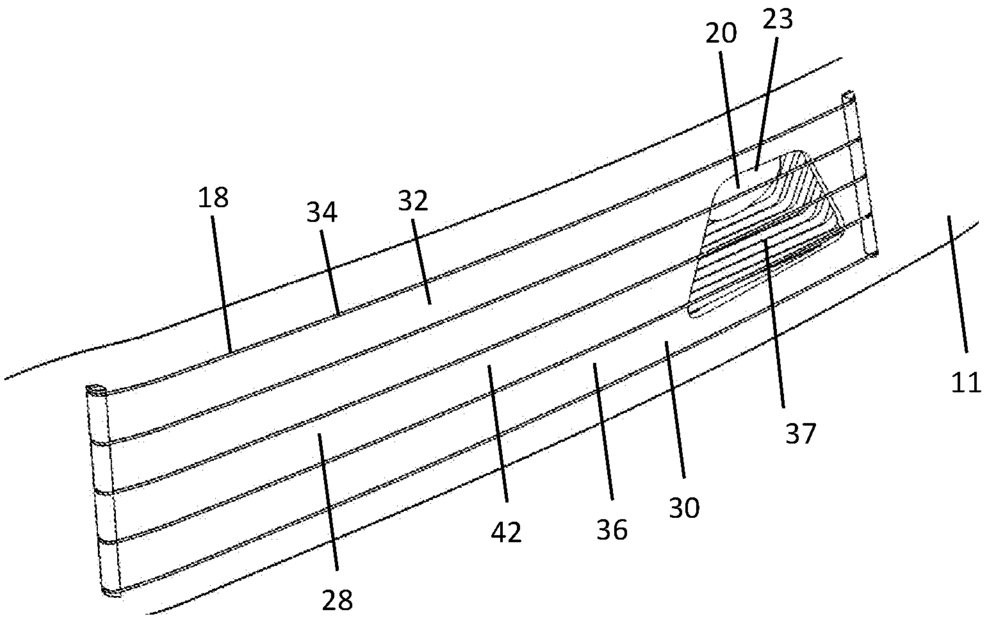
FIG. 13 is a seventh detail view of an exemplary embodiment of the sensor assembly according to the invention.

Cover element 18 comprises an injection-molded body 22, which is made of a polycarbonate material and on which a backing film assembly is disposed. Body 22 comprises an inner side 24, which faces in the direction of the at least one sensor element 20, and an outer side 28, which faces in the direction of a vehicle environment. The backing film assembly is preferably disposed on outer side 28. The backing film assembly can preferably be provided with a protective coating 30, which is a scratch, weather and chemical protection and made of a paint system (see FIGS. 13 to 15, for example).

The backing film assembly comprises a backing film 32, which is made of a polycarbonate material and provided with a plurality of conductor paths 34, which are a heating feature for cover element 18. Backing film 32 is disposed on outer side 28 of body 22. Conductor paths 34 are disposed on the side of backing film 32 facing sensor element 20.

Figure 8:
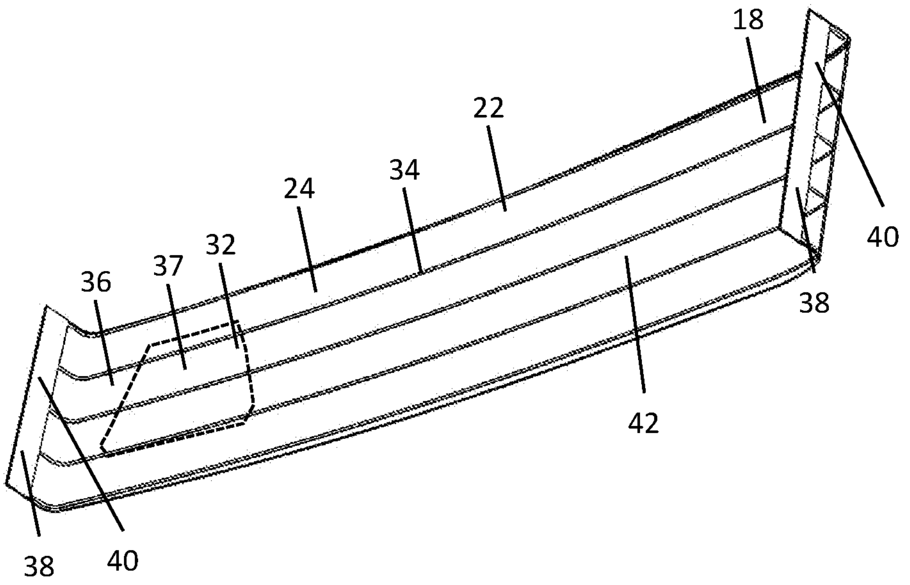
FIG. 8 is a second detail view of an exemplary embodiment of the sensor assembly according to the invention.
Figure 9:
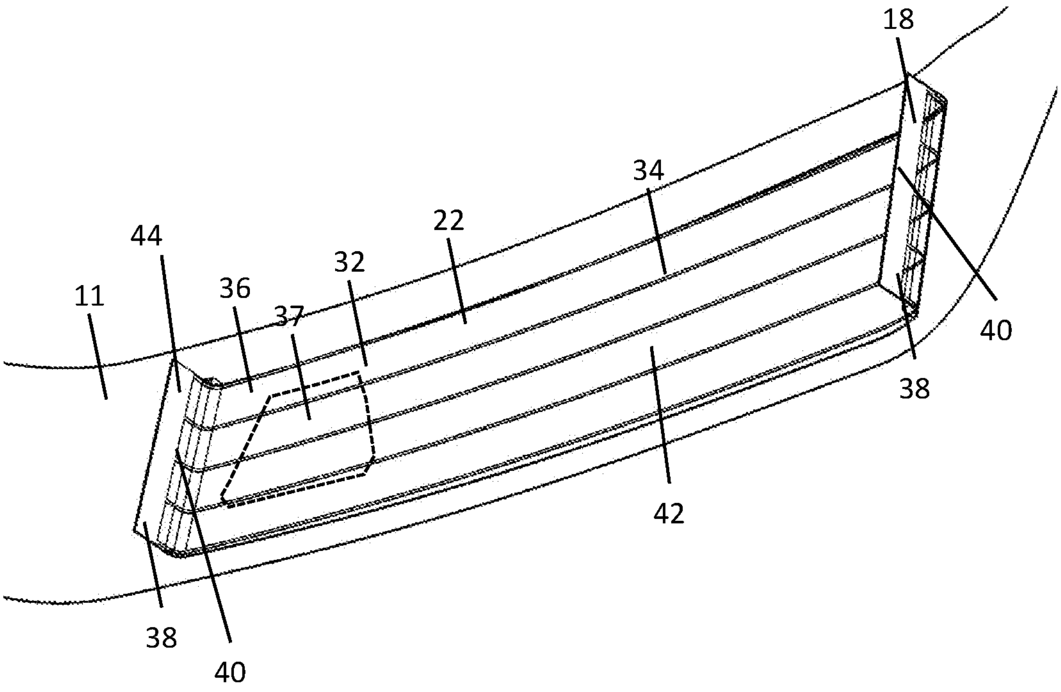
FIG. 9 is a third detail view of an exemplary embodiment of the sensor assembly according to the invention.
Figure 10:
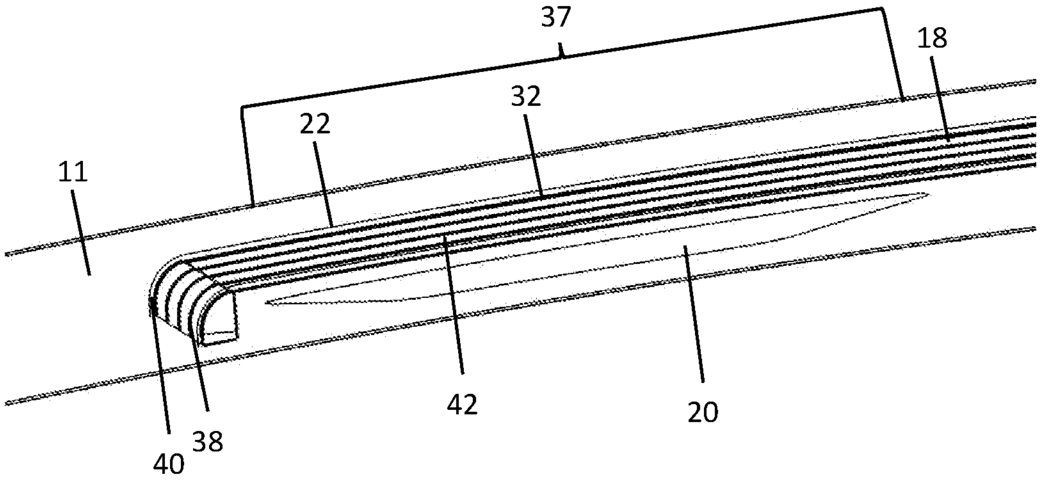
FIG. 10 is a fourth detail view of an exemplary embodiment of the sensor assembly according to the invention.
Figure 11:
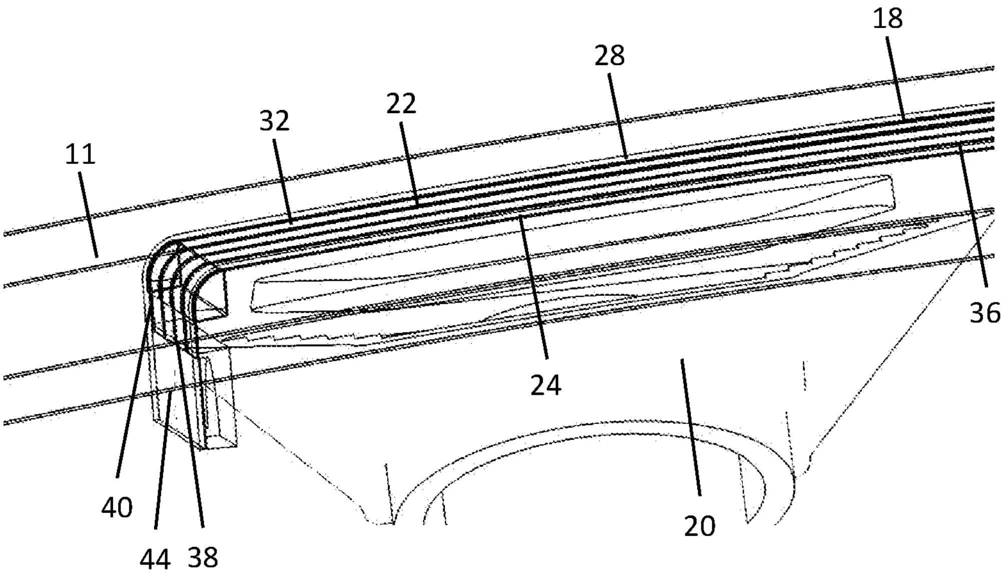
FIG. 11 is a fifth detail view of an exemplary embodiment of the sensor assembly according to the invention.
Figure 12:
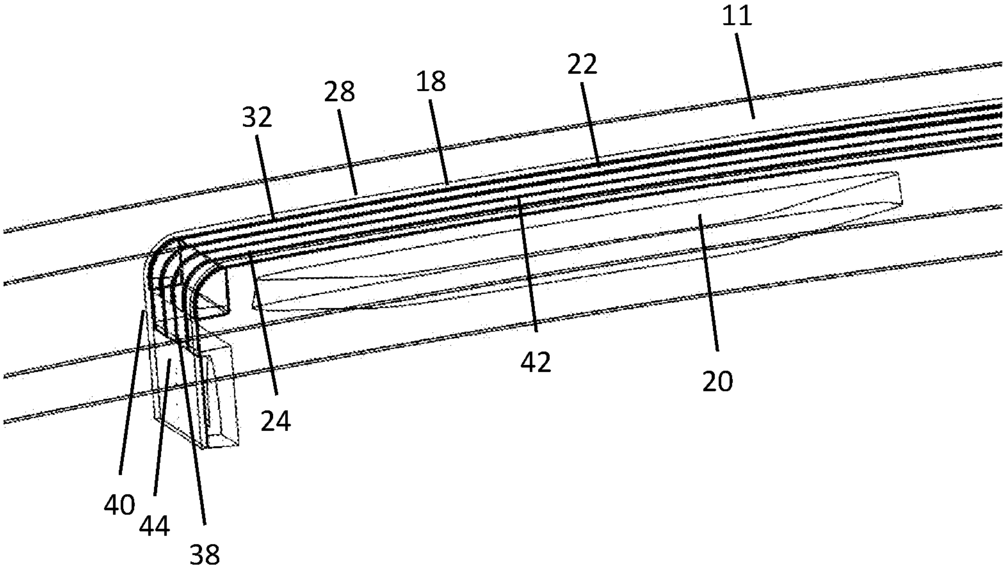
FIG. 12 is a sixth detail view of an exemplary embodiment of the sensor assembly according to the invention.
Figure 14:
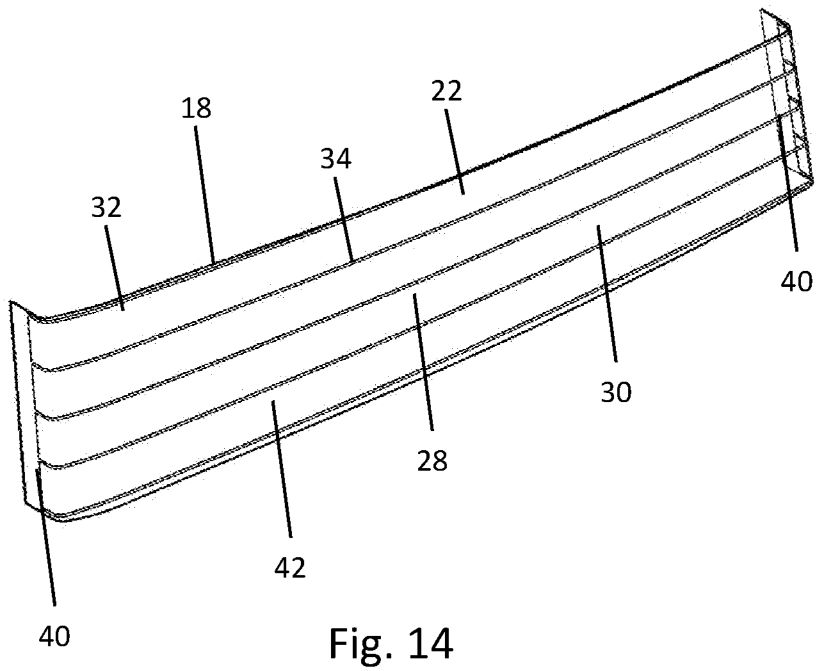
FIG. 14 is a eighth detail view of an exemplary embodiment of the sensor assembly according to the invention.
Figure 15:
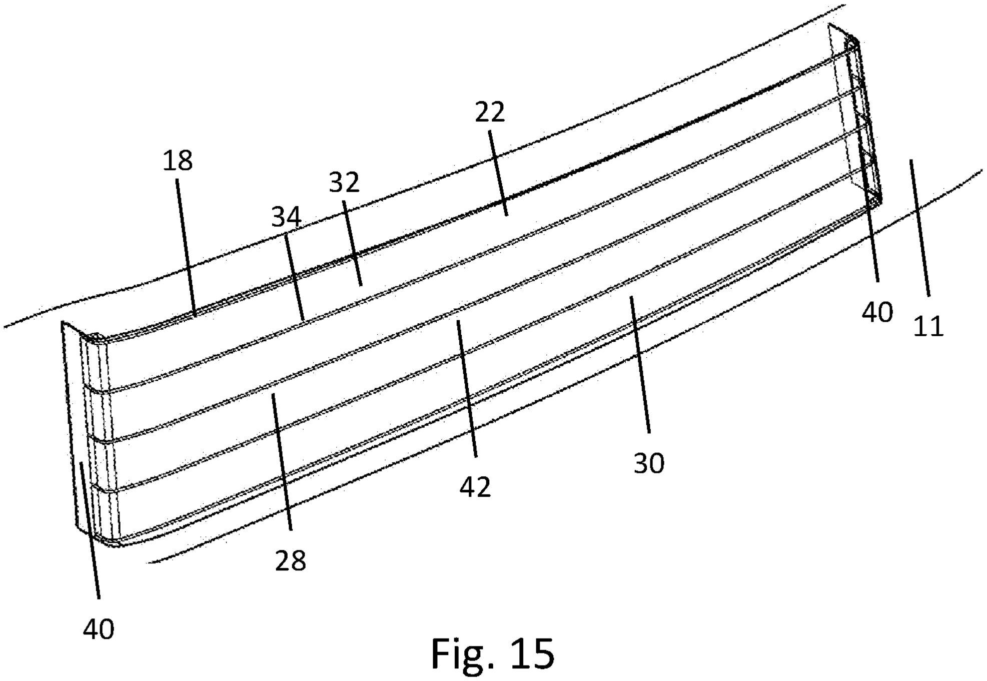
FIG. 15 is a ninth detail view of an exemplary embodiment of the sensor assembly according to the invention.

Furthermore, the backing film assembly comprises two bus bars 38, which connect conductor paths 34 in an electrically conductive manner. Bus bars 38 are significantly larger than conductor paths 34. Cover element 18 can have any geometrical shape, which can be seen in different views in FIGS. 7 to 15, for example. Bus bars 38 are comprised in two leg areas 40 of cover element 18, which protrude over plane leg connection 42, and are overmolded with a plastic layer, that is, a second plastic component 37, which is made of a first plastic. The latter can preferably differ from the plastic of body 22, which is provided in the area of leg connection 42, at least in terms of the material thickness. Particularly preferably, the plastic in leg areas 40 is opaque to the human eye and appears black (not visualized in the Figures). Particularly preferably, cover element 18 is composed of two different plastic components. First plastic component 36 can preferably be non-transparent to the human eye (in particular for wavelengths in the range of visible light) and appear black, for example. Preferably, first plastic component 36 is transparent to wavelengths used by lidar sensor 21. Preferably, cover element 18 comprises a second plastic component 37, which is transparent to the human eye (in particular for wavelengths in the range of visible light). Parts and/or portions of cover element 18 can preferably be made of first plastic component 36 and/or second plastic component 37. For instance, cover element 18 can be made of second plastic component 37 in the area of camera 23 (in a see-through area of camera 23), camera 23 being able to optically detect the vehicle environment through second plastic component 37 (see FIG. 8). The see-through area of lidar sensor 21 can preferably be in-mold laminated at least with first plastic component 36 and thus preferably appear black, in particular non-transparent, to the human eye. Preferably, cover element 18 is also made of or comprises first plastic component 36 in the area of the legs. FIGS. 14 and 15 additionally show a cover element 18 which does not have a transparent area or an area made of second plastic component 37.

The two bus bars 38 each at least partially form an electrical connecting element, which protrudes from cover element 18, in particular from plane leg connection 42, and which is exposed so that electrical contact can be made with it. Particularly preferably, each leg area 40 forms a mechanical contact 44, at which cover element 18 can be connected to a circuit via cables (see FIGS. 7, 9, 11 and 12).

The invention claimed is:

1. A sensor assembly of a motor vehicle, the sensor assembly comprising:

at least one sensor element emitting and/or detecting electromagnetic radiation in at least one measuring direction to determine a measuring signal, a cover element disposed in front of the sensor element in the at least one measuring direction and being an injection-molded plastic part which has at least one layer and is transparent to the electromagnetic radiation, and a heating feature comprising a plurality of conductor paths applied to a backing film molded to the cover element, the backing film including the conductor paths thus forming an insert of the injection-molded cover element, the conductor paths being at least partially located on the side of the backing film facing the sensor element, wherein the conductor paths are connected to each other in an electrically conductive manner by at least two bus bars and the at least two bus bars each at least partially form an electrical connecting element protruding from the cover element and being exposed so that electrical contact can be made with the electrical connecting elements.

2. The sensor assembly according to claim 1, wherein after the injection-molding process, the backing film, together with the conductor paths, has been molded to the cover element in such a manner that the electrical connecting elements, which are at least partially formed by the at least two bus bars, are formed in an end portion of respective leg areas of the cover element and at least part of the leg areas forms a mechanical contact.

3. The sensor assembly according to claim 2, wherein the two leg areas of the cover element protrude from the latter against the measuring direction.

4. The sensor assembly according to claim 2, wherein the bus bars are at least partially disposed in the respective leg areas of the cover element and are overmolded with the injection-molding plastic and the electrical connecting elements formed at the end portions are exposed.

5. The sensor assembly according to claim 1, wherein the cover element comprises an outer side, which faces the vehicle environment, and an inner side, which faces the sensor element, and the backing film is disposed on the outer side.

6. The sensor assembly according to claim 1, wherein the plastic of the cover element is made of at least one polycarbonate material.

7. The sensor assembly according to claim 1, wherein the backing film comprises at least one polycarbonate material.

8. The sensor assembly according to claim 1, wherein the cover element is provided with a protective coating at its outer side.

9. The sensor assembly according to claim 8, wherein the protective coating has a lower refractive index than the plastic material of the cover element.

10. The sensor assembly according to claim 1, wherein the cover element at least partially comprises a first plastic component, which is non-transparent to the human eye and transparent to the at least one sensor element and/or that the cover element at least partially comprises a second plastic component, which is transparent to the human eye and the at least one sensor element.

11. The sensor assembly according to claim 10, wherein the at least one sensor is at least one of a lidar sensor and a camera.

12. The sensor assembly according to claim 1, wherein the backing film is at least partially in-mold laminated and/or overmolded with a first plastic component, which is non-transparent to the human eye and transparent to the at least one sensor element and/or that the backing film is at least partially in-mold laminated and/or overmolded with a second plastic component, which is transparent to the human eye and to the at least one sensor element.

13. The sensor assembly according to claim 12, wherein the at least one sensor is at least one of a lidar sensor and a camera.

14. The sensor assembly according to claim 1, wherein the cover element is an outer skin element of a vehicle roof.

15. The sensor assembly according to claim 1, wherein the cover element is an outer skin element of a vehicle front end or a vehicle rear end.

16. A roof module for forming a vehicle roof on a motor vehicle comprising a panel component at least partially forming a roof skin of the vehicle roof, the roof skin serving as an outer sealing surface of the roof module, and at least one sensor assembly according to claim 1.

17. A motor vehicle comprising a vehicle body and a roof module according to claim 16, the roof module being disposed on the vehicle body as a structural unit.

18. A method for producing a cover element of a sensor assembly of a motor vehicle, the method comprising the following steps: providing a backing film having a first side and a second side; applying, a plurality of conductor paths and at least two bus bars to the first side of the film; introducing, the backing film with the conductor paths into a cavity of an injection mold in such a manner that the two bus bars protrude over the conductor paths; filling the cavity of the injection mold with at least one plastic material in such a manner that the two bus bars each form an electrical connecting element which remains free from the plastic material; hardening the plastic material in the cavity for forming the cover element having the backing film molded thereto; and demolding the cover element with the backing film molded thereto.

19. The method for producing a cover element of a sensor assembly of a motor vehicle of claim 16, wherein the step of the applying a plurality of conductor paths and at least two bus bars to the first side of the film is by screen printing; wherein the step of introducing the backing film is by inserting the backing film with the conductor paths into a cavity of an injection mold; and wherein the step of filling the cavity of the injection mold with at least one plastic material is by filing a first plastic component and/or a second plastic component.

20. A sensor assembly of a motor vehicle, the sensor assembly comprising:

at least one sensor element emitting and/or detecting electromagnetic radiation in at least one measuring direction to determine a measuring signal, a cover element disposed in front of the sensor element in the at least one measuring direction and being an injection-molded plastic part which has at least one layer and is transparent to the electromagnetic radiation, and a heating feature comprising a plurality of conductor paths applied to a backing film molded to the cover element, the backing film including the conductor paths thus forming an insert of the injection-molded cover element, the conductor paths being located on the side of the backing film facing the sensor element, wherein the conductor paths are connected to each other in an electrically conductive manner by at least two bus bars and the at least two bus bars each at least partially form an electrical connecting element protruding from the cover element and being exposed so that electrical contact can be made with the electrical connecting elements, and wherein each of the electrical connecting elements is formed by a portion of a respective bus bar that remains free of the injection-molding plastic of the cover element.

* * * * *